United States Patent [19]
Costa

[11] Patent Number: 5,094,506
[45] Date of Patent: Mar. 10, 1992

[54] CHILD'S SAFETY CAR SEAT WINDSHIELD

[76] Inventor: Michael Costa, 3416 S. 70th St., Tampa, Fla. 33619

[21] Appl. No.: 735,495

[22] Filed: Jul. 25, 1991

[51] Int. Cl.⁵ .............................................. A47C 7/10
[52] U.S. Cl. ..................................... 297/184; 297/188
[58] Field of Search ............... 297/184, 188, 250, 467, 297/488

[56] References Cited

U.S. PATENT DOCUMENTS

| | | | |
|---|---|---|---|
| 4,027,915 | 6/1977 | Anderson et al. | 297/184 |
| 4,314,727 | 2/1982 | Potts | 297/184 |
| 4,540,219 | 9/1985 | Klinger | 297/188 X |
| 4,579,585 | 4/1986 | Koenig | 297/184 |
| 4,923,249 | 5/1990 | Mattox | 297/184 |

*Primary Examiner*—Laurie K. Cranmer
*Attorney, Agent, or Firm*—Dykema Gossett

[57] ABSTRACT

This invention relates to a new and improved windshield assembly for use with a conventional child safety car seat in a motor vehicle with an open top. The invention also relates to a means of securing the windshield to the child safety car seat using its existing automobile safety belt attachment slots. The object of the invention is to protect the child from harsh direct wind, pebbles, insects and exposure to excessive sunlight while the child is riding in a motor vehicle with an open top. The windshield envisioned is made of a rigid transparent photosensitive material which either changes sun screening characteristics in response to a change in light intensity or is composed of transparent tinted plastic which decreases or otherwise filters incident light. The windshield is designed to allow the child to enjoy the view by enabling him or her to see clearly through the device and likewise to enable adults to see the child.

23 Claims, 1 Drawing Sheet

U.S. Patent      Mar. 10, 1992      5,094,506
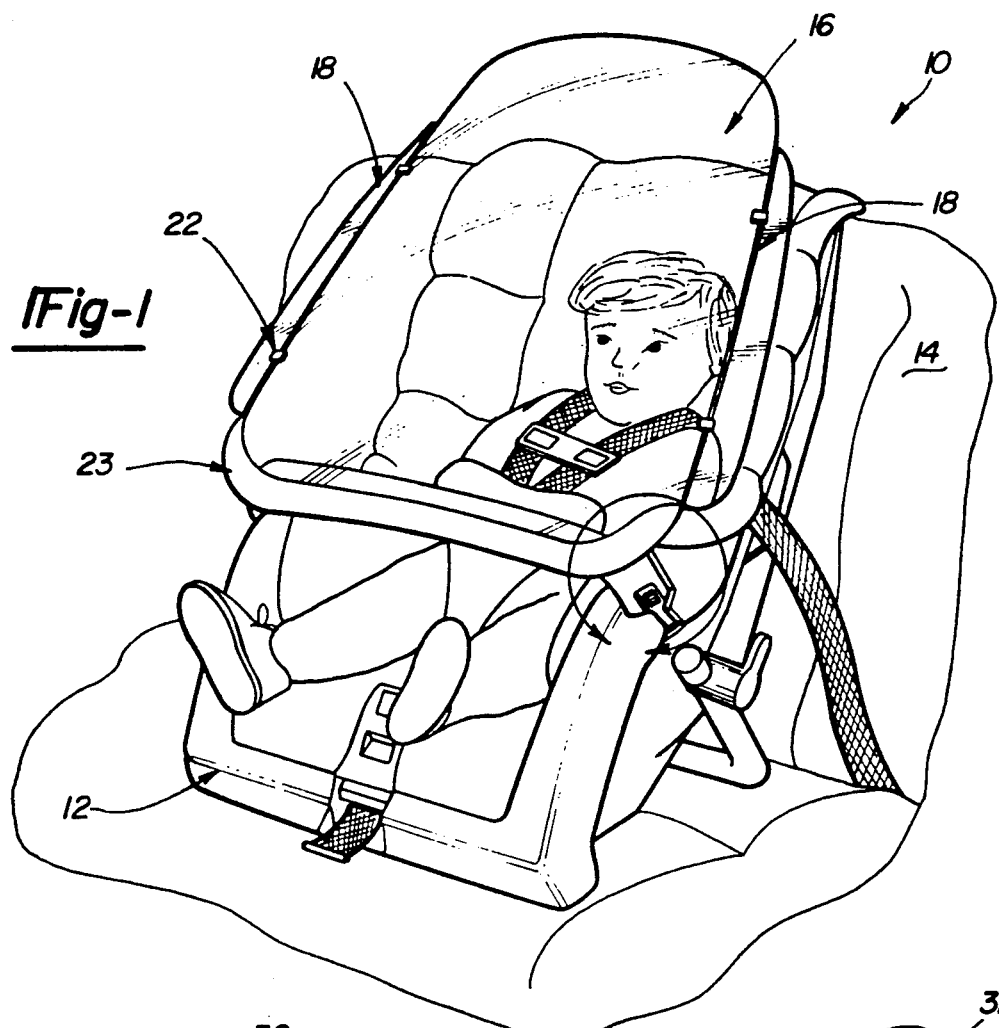
*Fig-1*
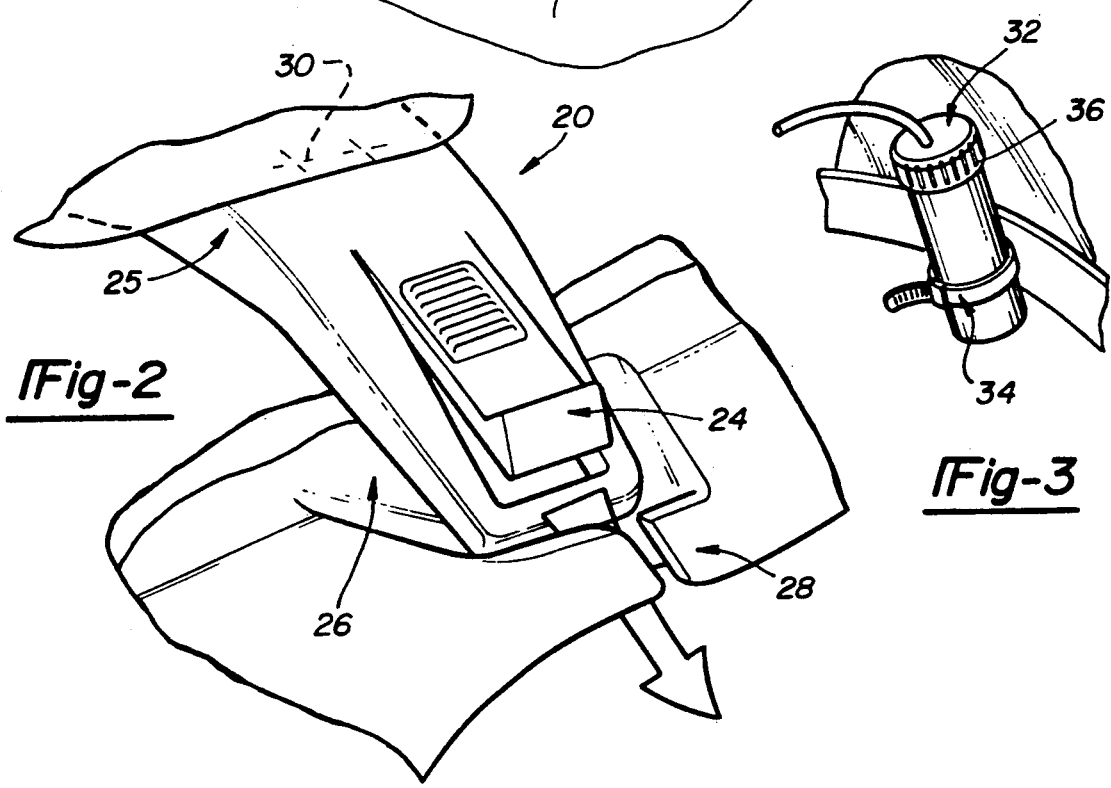
*Fig-2*
*Fig-3*

CHILD'S SAFETY CAR SEAT WINDSHIELD

FIELD OF INVENTION

The field of invention relates to windshields. More particularly, the invention relates to a new and improved windshield assembly for use with a conventional child's safety car seat in a motor vehicle with an open top. The invention also relates to a means of securing the windshield to the child's safety car seat using existing automobile safety belt slots. The object of the invention is to protect the child from harsh direct wind, pebbles, insects and exposure to excessive sunlight while the child is riding at highway speeds in a motor vehicle with an open top.

BACKGROUND OF THE INVENTION

All 50 states now require that infants and toddlers be securely fastened into a car seat while riding in a moving vehicle. Since 1982, children's car seats have been subject to strict safety standards. An infant weighing less than 20 pounds should ride in a rearward-facing car seat. When the child reaches 20 pounds and can sit upright and unaided, a forward-facing restrain becomes appropriate.

Many car seat models can be adapted from a rearward-facing infant seat to a forward-facing toddler seat. These adaptable seats feature either a three-point or a five-point harness system and/or an armrest or T-shaped restraint. When used in the rearward-facing infant mode, the child safety seat typically is secured to the interior of the automobile using in the front of the seat which receive the automobile safety belt.

The forward facing position uses slots in the rear of the seal for receiving the seat belt. It is known that children's car seats can be equipped with sun visors and windshields. However, these previous devices were not designed to sue existing automobile safety belt slots which were originally designed for use in the safety car seat's rearward-facing infant mode. Nor were these devices designed to withstand harsh direct winds incident on a toddler riding in the rear seat of a convertible automobile while providing the child a safe vantage point from which to enjoy the ride.

One previous attempt is disclosed in U.S. Pat. No. 4,947,883, issued to Mayo. This patent discloses an infant sun shade apparatus having a plurality of vertically oriented transparent planes formed with a malleable memory retentive channel along the lower edge to receive a rope for securing the device to a child carrier. This invention is designed primarily as a sun shade for use in a closed motor vehicle rather than an as a windshield for use in an open top motor vehicle as is the present invention. This unit is not designed to withstand the strong wind encountered in convertible vehicles.

Another attempt is disclosed in U.S. Pat. No. 4,579,385, issued to Koenig. This patent discloses a sunshade and protective cushion device for use with a conventional child safety car seat. The device includes a pair of peripherally joined flexible sheets and a valve for permitting pressurization of the airspace between the sheets. This device is designed primarily as a sunshade to prevent the child's exposure to excessive sunlight and as a cushion to prevent discomfort to the child when the automobile makes sudden changes in speed or direction. A disadvantage of this device is that it interferes with the child's view. William Boyle, MD, practicing pediatrician at The Hitchcock Clinic, in Hanover, N.H. is quoted in a recent article in *American Baby* regarding children's safety car seats. He notes that a better vantage point from which to enjoy the ride is one benefit of a child's safety car seat. The construction of the '385 invention negates this benefit and prevents the child from enjoying the view because the device is difficult to see through. By the same token, the child cannot be seen well by its parents. This unit would also problems when subjected to the force of the wind encountered in convertibles.

A still further attempt is disclosed in U.S. Pat. No. 4,314,727, issued to Potts. An easily detachable all-purpose weather guard with manually operated air vents and moisture collection troughs on all sides, flexible rain diversion spouts and a padded bottom edge are disclosed. The device can be attached to a child's car seat by quick disconnecting snaps or loop and pile fasteners. This invention is distinguishable form the present invention because it cannot be mounted to a conventional child safety car seat without modification of the car seat. The '727 patent discloses cooperating attachment means mounted on both the guard and the child's car seat rather than using the existing automobile safety belt attachment slots designed originally for the rearward-facing infant mode of the car seat. The present invention is further distinguished from the unit disclosed in the '727 patent because the cooperating attachment means disclosed by the '727 patent is not designed to withstand the force of harsh direct winds incident on a child riding in the rear seat of a convertible automobile as is the attachment means of the present invention.

The above devices fail to set forth a child's car seat windshield which achieves the degree of effectiveness in preventing the child's exposure to harsh direct winds generated in an open top motor vehicle as does the present invention or one which also can be mounted to any conventional child safety seat by using its existing automobile safety belt attachment slots. The present invention meets these needs while enabling the child to enjoy the ride by allowing him or her to see clearly through the device. Adults likewise have a better view of the child.

SUMMARY OF THE INVENTION

The general object of the invention is to provide an effective windshield constructed of strong yet lightweight materials which protects a child from exposure to harsh winds, pebbles, insects and excessive sunlight while he or she is riding at highway speeds in a motor vehicle with an open top. The windshield envisioned is one which can be attached to any conventional adaptable child safety car seat using the automobile safety belt attachment slots which were designed originally for use in the child's safety car seat's rearward-facing infant mode. The windshield can be made of a photosensitive material which changes sun screening characteristics in response to al change in light intensity or can be composed of a transparent tinted material which filters incident light to provide added safety and enjoyment for the child.

A specific object of the invention is to allow the child to enjoy the view by enabling him or her to see clearly through the device and likewise to give adults a better view of the child. This object is accomplished by constructing the front windshield component of a rigid transparent material.

Another specific object of the invention is to aid in preventing the child from escaping, in Houdini-like fashion, from the conventional child safety car seat. This object is accomplished by attaching the windshield assembly to the car seat using a locking buckle designed and positioned to make escape more difficult for the child. The locking buckle employs a quick-release attachment means which is easy for an adult to release in an emergency evacuation situation.

Another specific object of the invention is to construct a safe device. This object is accomplished by designing sufficient frontal protrusion and side clearance of the windshield to ensure that the child's appendages such as fingers, were they extended, and the child's head will not contact the windshield during a sudden change in the motor vehicle's velocity. This design also minimizes claustrophobic conditions for the child. Sufficient padding to protect the torso of the child against the force of changes in velocity of the vehicle and to protect the arms of an adult installing or removing the device is also to be provided.

Another specific object of the invention is that the windshield be easy to remove for quick and convenient storage in any motor vehicle. This object is accomplished by mounting the windshield to the child's safety car seat using a quick-release buckle design.

Another specific object of the invention is to provide a convenient and securely mounted beverage bottle furnishing refreshment and distraction for the child's amusement.

Another specific object of the invention is to provide a novel windshield for a child's safety car seat which accomplishes the foregoing general and specific objectives which is cost effective to manufacture.

In view of the foregoing disadvantages inherent in known windshield and sunshade devices for children's car seats, the present invention represents a significant improvement in the art. The invention may be attached to a conventional child safety seat to protect the child from exposure to wind, flying debris and to shade the child from excessive sunlight while he or she is riding at highway speeds in a motor vehicle with an open top. The general purpose of the present invention, which will be described subsequently in greater detail, is to provide a new and improved windshield for use with a conventional car seat which has all the advantages of the prior art and none of the disadvantages. This invention is immediately applicable to children's safety car seats.

BRIEF DESCRIPTION OF THE DRAWINGS

FIG. 1 is an isometric illustration of the windshield assembly attached to a conventional adaptable child safety car seat which is itself secured to the seat of a motor vehicle.

FIG. 2 is an detail isometric illustration of the windshield assembly attachment means which utilizes the car seat's existing automobile safety belt attachment slots which were designed originally for use in the rearward-facing infant mode to secure the child's safety car seat to the automobile interior.

FIG. 3 is an isometric illustration of the beverage bottle mounted to the windshield assembly.

DETAILED DESCRIPTION OF THE PREFERRED EMBODIMENTS

Referring to FIG. 1 of the drawings, a new and improved windshield assembly is shown generally by reference numeral 10. The windshield assembly is designed for use with a conventional adaptable child safety car seat 12 shown strapped in place inside motor vehicle environment 14.

More specifically, child's safety car seat windshield assembly 10 includes a rigid transparent convexo-concave front shield 16, lateral panels 18 and windshield assembly attachment means 20 which secures windshield assembly 10 to conventional child safety car seat 12 using the car seat's existing automobile safety belt attachment slots which were designed originally for use in the car seat's rearward-facing infant mode to secure the child's safety car seat to the automobile interior.

Shield 16 and lateral panels 18 are formed of plexiglass and preferably Lexan (DOT 94). Further, the shield 16 could have either photosensitive properties that enable the material to deflect more light in response to increasing light intensity or which is tinted to provide sun filtering capabilities if desired.

Lateral panels 18, which form a flush joint with front shield 16, are attached to shield 16 with a plurality of lateral panel fastening means 22 providing aerodynamic continuation of shield 16. Fastening means 22 are standard fastening means for fastening plastic. One example of the type of fastening means 16 which could be used is a hinged bracket having one or more holes on each side of the hinge for receipt of a fastener. These fasteners would extend through the plexiglass and receive a nut or other type fastener to secure the hinge in place. This type of fastener would allow the lateral panels 18 to be adjusted. Molded padding 23 is secured along the bottom edge of shield 16 with a suitable adhesive.

Referring now to FIG. 2 of the drawings, the preferred embodiment of windshield assembly attachment means denoted generally as numeral 20 is shown in detail. The preferred embodiment comprises flanged tongue 24 which is integral with but extends rigidly away from buckle frame 25. As buckle frame 25 travels through automobile safety belt slot 26, flanged tongue 24 is seated under pressure into buckle frame 25 until flanged tongue 24 clears and hooks securely on the edge of automobile safety belt slot rim 28, locking windshield assembly 10 to car seat 12. Attachment means 20 is itself attached to the shield 16 by a plurality of buckle attachment fastening means 30, for example self-tapping screws. It should be apparent to those of ordinary skill in the art that other attaching means 30 could be used, for example, rivets or bolts, also means 20 could be integrally formed to shield 16.

Referring now to FIG. 3 of the drawings, beverage bottle 32 is secured to the lower inside edge of front shield 16 using beverage bottle attachment means 34. Attachment means 34 is illustrated as a strap or buckle. A strap with Velcro could also be used as well as other attaching means. Beverage bottle attachment means 34 is itself attached to front shield 16 using snaps 36 or other attaching means.

The foregoing description is intended only to illustrate the invention's principles. Because numerous variations in size, materials, assembly and use will readily occur to one skilled in the art, it is not the intent of this specification to limit the invention to the exact construction and operation shown and described. All relationships equivalent to those illustrated in the drawings and described in the specification are intended to be encompasses by the present invention and therefore, fall within the scope of the invention.

I claim:

1. A protective windshield assembly for use on a child safety seat, said safety seat having a plurality of seat belt slots therein for use in securing the safety seat in the interior compartment of a vehicle, said windshield assembly comprising:

a front windshield;

bracing means for supporting said front windshield with respect to said safety seat;

attachment means for removably attaching said windshield to at least one of said seat belt slots;

whereby, said windshield assembly can be easily and quickly mounted to and removed from the existing seat belt slots of a child's safety seat.

2. The protective windshield assembly of claim 1, wherein said front windshield is convexo-concave with respect to the front of the child's safety seat.

3. The protective windshield assembly of claim 1, wherein said front windshield has deflective wings attached to sides of said front windshield for deflecting wind.

4. The protective windshield assembly of claim 3, wherein said deflective wings are hingedly connected to said front windshield.

5. The protective windshield assembly of claim 1, wherein said bracing means comprises a curved rigid support attached along the base of said windshield from which said attachment means extend outwardly for connection to said plurality of seat belt slots.

6. The protective windshield assembly of claim 5, wherein said bracing means is covered with a soft protective material.

7. The protective windshield assembly of claim 1, wherein said front windshield is secured along its base to said bracing means by an adhesive.

8. The protective windshield assembly of claim 1, wherein said attachment means comprises a buckle frame from which a flanged tongue extends, said flanged tongue being biased with respect to said buckle frame such that it is normally protruding outwardly therefrom, said buckle frame having an outside diameter which is less than the inside diameter of at least one of said seat belt slots whereby said buckle frame can be inserted into said seat belt slot with said flange tongue protruding outwardly once inserted securing said windshield assembly within said seat belt slot.

9. The protective windshield assembly of claim 1, wherein said child's safety seat includes upwardly standing sidewalls ending in upper arm rests, said arm rests having at last one seat belt slot formed therein and adapted for receipt of a seat belt, said attachment means including a buckle frame with an outwardly protruding flanged tongue, said buckle frame having an outer diameter less than the inner diameter of said seat belt slot in said arm rest, said buckle frame being adapted for insertion into said seat belt slot with said flanged tongue engaging said seat belt slot once said frame is fully inserted preventing said buckle frame from being removed without first depressing said flanged tongue.

10. The protective windshield assembly of claim 1, further including a beverage bottle secured to said windshield assembly and protruding inwardly into said safety seat compartment.

11. The protective windshield assembly of claim 1, wherein said front windshield is tinted.

12. The protective windshield assembly of claim 1, wherein said front windshield is made of transparent photosensitive material which changes sunscreening characteristics in response to a change in light intensity.

13. An improved infant safety seat for use in open compartment automobiles, said improved safety seat including a seating compartment for receipt of a child, said seating compartment having a plurality of seat belt slots for securing said seat within an automobile compartment, said slots being positioned across the front of said safety seat and across the rear of said safety seat;

a single rigid transparent shatter-proof windshield mounted to the front of said safety seat by mounting means received and secured within said seat belt slots extending across the front of said safety seat;

said mounting means having a quick release attaching means which interconnects said windshield to said seat belt slots extending across the front of said safety seat;

whereby, said windshield assembly protects the child against harsh direct winds and flying debris while the child rides in an open top motor vehicle.

14. The infant safety seat of claim 13, wherein said windshield is convexo-concave with respect to the front of the child's safety seat.

15. The infant safety seat of claim 13, wherein said windshield has deflective wings attached to the sides of said front windshield for deflecting wind.

16. The infant safety seat of claim 15, wherein said deflective wings are hingedly connected to said windshield.

17. The infant safety seat of claim 13, wherein said mounting means includes bracing means for connecting said windshield to said mounting means, said bracing means including a curved rigid support attached along a base of said windshield from which said attachment means extends outwardly for connection to said plurality of seat belt slots.

18. The infant safety seat of claim 17, wherein said bracing means is covered with a soft protective material.

19. The infant safety seat of claim 13, wherein said attachment means comprises a buckle frame from which a flanged tongue extends, said flanged tongue being biased with respect to said buckle frame such that it is normally protruding outwardly therefrom, said buckle having an outside diameter which is less than the inside diameter of at least one of said seat belt slots whereby said buckle frame can be inserted into said seat belt slot with said flanged tongue protruding outwardly securing said windshield within said seat belt slot.

20. The infant safety seat of claim 13, wherein said child's safety seat includes upwardly standing sidewalls ending in upper arm rests, said arm rests having at least one seat belt slot formed therein for receipt of a seat belt, said attachment means including a buckle frame with an outwardly protruding flanged tongue, said buckle frame having an outer diameter less than the inner diameter of said safety belt slot in said arm rest, whereby, said buckle frame can be inserted into said seat belt slot with said flanged tongue engaging said seat belt slot preventing said buckle frame from being removed without depressing said flanged tongue.

21. The infant safety seat of claim 13, further including a beverage bottle secured to said windshield assembly and protruding inwardly into said safety seat compartment.

22. The infant safety seat of claim 13, wherein said windshield is tinted.

23. The infant safety seat of claim 13, wherein said windshield is made of transparent photosensitive material which changes sunscreening characteristics in response to a change in light tensity.

* * * * *